May 14, 1957 E. T. DOUGLASS, JR 2,792,153
WOOD WASTE CONVEYING AND FEEDING APPARATUS
Filed March 1, 1956 2 Sheets-Sheet 1

INVENTOR.
EDWARD T. DOUGLASS JR.
BY
Jennings & Carter
ATTORNEYS

May 14, 1957 — E. T. DOUGLASS, JR — 2,792,153
WOOD WASTE CONVEYING AND FEEDING APPARATUS
Filed March 1, 1956 — 2 Sheets-Sheet 2

INVENTOR.
EDWARD T. DOUGLASS JR.
BY Jennings & Carter
ATTORNEYS

United States Patent Office 2,792,153
Patented May 14, 1957

2,792,153

WOOD WASTE CONVEYING AND FEEDING APPARATUS

Edward T. Douglass, Jr., Birmingham, Ala.

Application March 1, 1956, Serial No. 568,844

2 Claims. (Cl. 222—226)

My invention relates to apparatus for conveying and discharging from a bin or hopper wood waste such as sawdust, shavings, board cut-offs and the like, and embodies some of the features shown, described and claimed in my prior Patent No. 2,735,585, dated February 21, 1956, "Apparatus for Conveying Wood Shavings and the Like."

My invention contemplates apparatus for conveying and feeding wood waste from a hopper, bin or the like to a pair of laterally spaced, parallel troughs each of which troughs embodies drag chains or the like, the troughs being in the bottom of the hopper or bin, together with means located above the troughs and between them to prevent the material from bridging over the troughs, assuring a uniform, regular flow of material to the troughs.

My invention contemplates the provision of apparatus of the character designated in which there is located between the troughs and elevated above the tops thereof a driven shaft, there being on the shaft a plurality of the curved breaker members forming the subject matter of my above identified patent, whereby material flows evenly from the common hopper or bin into both of the troughs, to be discharged by the chains or other conveyors in the troughs.

Briefly, my invention contemplates a storage bin or hopper having downwardly diverging walls. In the bottom of the bin are parallel elongated openings to which are connected downwardly directed walls forming troughs. The troughs have partial bottoms therein and on top of these partial bottoms are placed the upper flights of drag chains which are power driven. Mounted parallel to the troughs, at an elevation above the tops thereof and in the bin substantially equally spaced laterally between the troughs, is a shaft. Mounted on this shaft are a plurality of the breaker elements having curved leading edges and which are in all respects similar to those shown in my patent above identified. The shaft is mounted high enough above the openings in the bottom of the hopper or bin so that large pieces of material such as board cut-offs and the like may pass beneath the lower ends of the breaker elements as they rotate. Further, the blades or breaker elements are of such length that when rotating they overhang the inner edges of the troughs, thus to assure that the material does not bridge over the openings in the bottom of the bin, assuring a uniform flow of material to the drag chains, thence to be discharged by them. My invention thus embodies a single driven shaft with breakers thereon which is fully effective to prevent bridging over the chain equipped or like discharge troughs, whereby from a single bin I may discharge two separate streams of the material, thus increasing the capacity of the apparatus and eliminating the provision of a breaker shaft and breakers for each trough, individually.

Apparatus illustrating features of my invention is shown in the accompanying drawings forming a part of this application in which.

Figure 1:
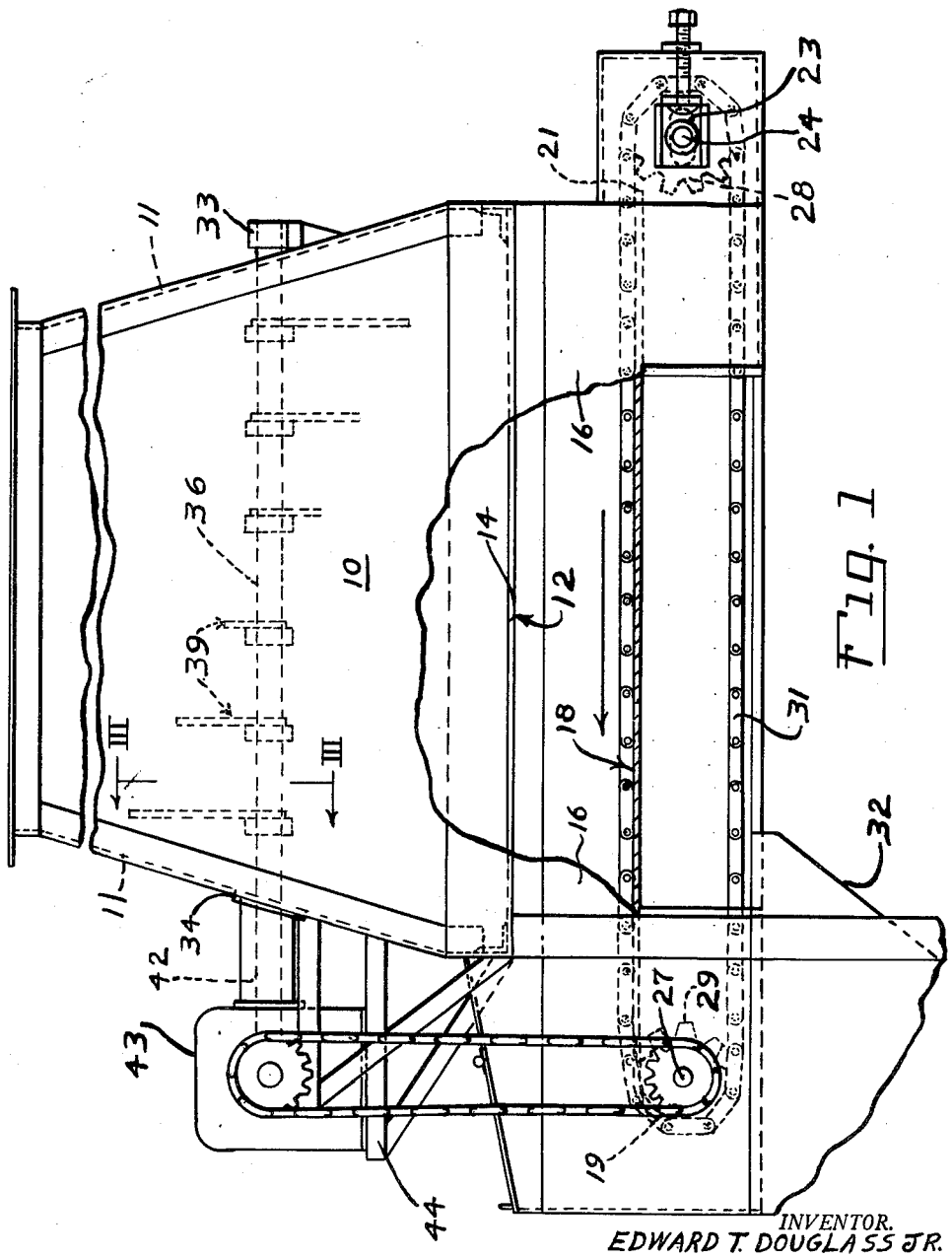
Fig. 1 is a side elevational view partly broken away and in section.
Figure 2:
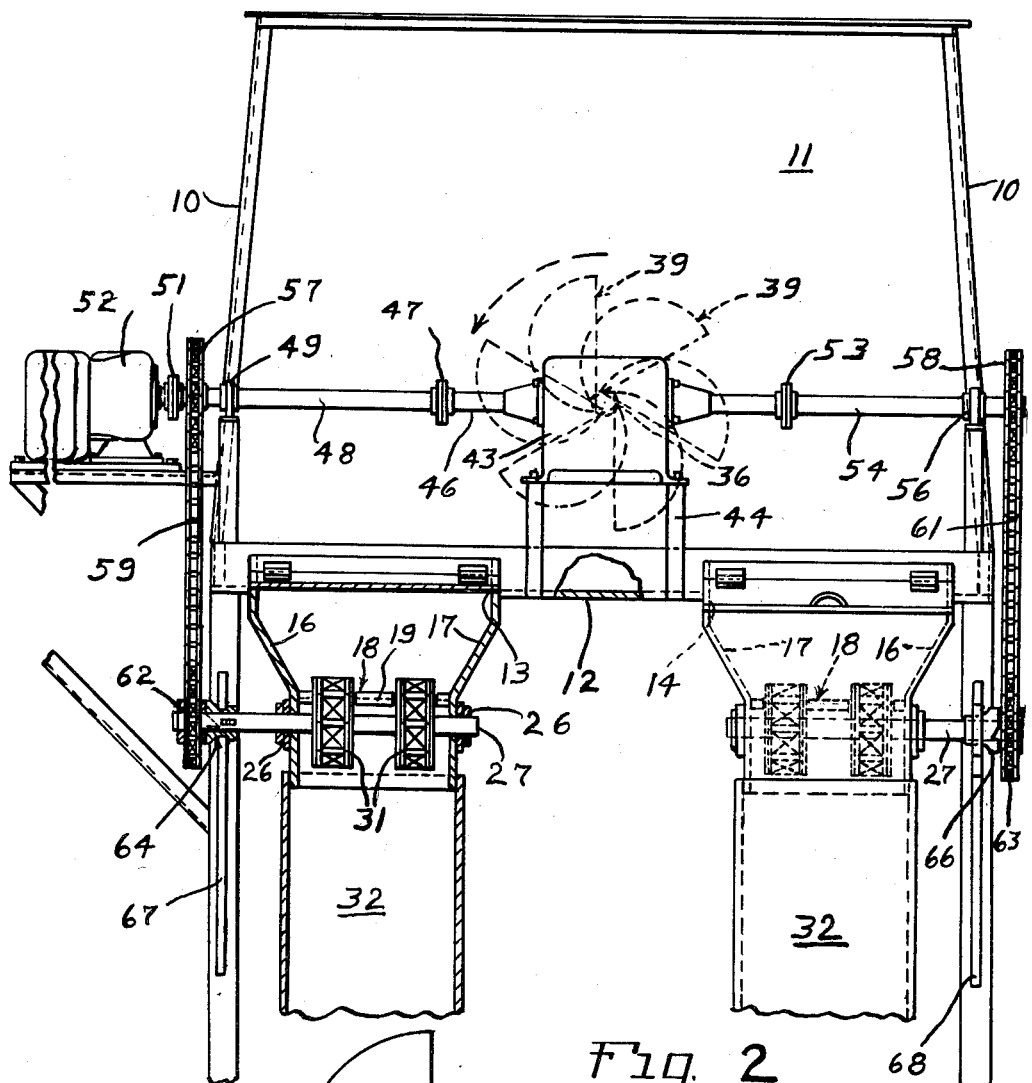
Fig. 2 is an end elevational view with certain parts broken away and in section; and, Fig. 3 is an enlarged detail sectional view taken generally along line III—III of Fig. 1.
Figure 3:
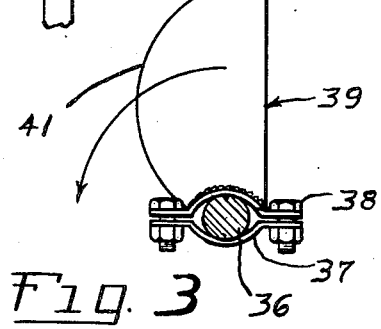

Referring now to the drawings for a better understanding of my invention my improved apparatus comprises a bin or hopper which may have a framework of angle irons in the manner well understood and which may be covered with sheet metal or the like to provide downwardly diverging side walls 10 and downwardly diverging end walls 11. The bin may have a bottom plate 12 therein having elongated, parallel openings 13 and 14 therein for the discharge of material from the bin as will be explained. It is through the openings 13 and 14 that the material discharges into the troughs now to be described. In view of the fact that the troughs and drag chains therein both are identical, a description of one will suffice for both.

Secured to the side edges of the openings 13 and 14 are downwardly and inwardly directed trough walls 16 and 17. Mounted on the walls to form a bottom in the trough is a plate 18 which terminates at the points 19 and 21 indicated in Fig. 1 of the drawings. It will be understood that these plates are welded or otherwise secured to the inner surfaces of the walls 16 and 17.

Mounted in bearings 23 is a rear shaft 24, and mounted in bearings 26 is a front shaft 27. Mounted on shaft 24 in each of the troughs are double sprockets 28, and similar double sprockets 29 are mounted on shaft 27. Passing over the sprockets is a doubled roller drag chain 31. The upper flight of the chain 31 lies on the plate 18, thereby to drag material in the direction of the arrow, Fig. 1, to discharge it over the end 19 of the plate 18 and into suitable discharge chutes 32.

Mounted in suitable bearings 33 and 34 in the end walls 11 is a shaft 36. Mounted on the shaft 36 by means of oval shaped collars 37 and bolts and nuts 38, are a plurality of the breaker plate units 39 described and claimed in my above identified patent. As described in said patent, the leading edges 41 of the breaker plates 39 are convexly curved whereby a more efficient bridge eliminating effect is attained. It will be understood that the units 39 are rotated by the shaft 36 when the latter rotates and that the units 39 may slip on the shaft when they encounter more than a predetermined resistance to rotation. It will also be noted that the shaft 36 and the breaker plates are mounted high enough above the bottom plate 12 to permit the passage therebeneath of any large pieces of material such as ends of boards, large knots and the like. Further, the plates 39 are of such length that when rotating they describe a circle over the tops of the inner edges of the troughs, thus assuring that bridging over is eliminated.

Shaft 36 is connected to the power output shaft 42 of a gear box 43 which is mounted on suitable framework 44 on the end of the apparatus. One end of the input shaft 46 of gear box 43 is connected through a flexible coupling 47 to a shaft 48 mounted in a bearing 49. Shaft 48 is connected by a flexible coupling 51 to an electric motor 52. The opposite end of shaft 46 is connected by a flexible coupling 53 to a shaft 54 likewise mounted in a bearing 56.

Sprockets 57 and 58 are mounted on the outer ends of the shafts 48 and 54, respectively. Sprocket chains 59 and 61 pass over the sprocket 57 and sprocket 62, and over the sprocket 58 and sprocket 63. The sprockets 62 and 63 are connected through clutch parts 64 and 66 to the shafts 27 thereby to drive the drag chains 31. The clutches may be disengaged selectively by means of operating levers 67 and 68, whereby either of the chains may be operated without operating the other.

From the foregoing the method of constructing and using my improved apparatus together with the several advantages thereof may now be readily explained and understood. The bin or hopper is maintained substantially full of the material which it is desired to discharge with a regulated feed through the chutes 32. With the motor 52 running and the clutches 64 and 66 engaged it will be apparent that shaft 36 is rotated and the chains are driven with their top flights approaching the chutes 32, dragging over the plates 18. Since the curved edges 41 of the breakers 39 are the leading edges, and since these breaker plates are mounted between the troughs and above the level of the bottom 12, the single set of breakers effectively serves to prevent bridging over of the material adjacent the openings 13 and 14, assuring that material is fed onto the upper flights of the chains in an even, steady manner. Therefore, the discharge through the chutes 32 is likewise even and steady. I thus prevent bridging over of two separate troughs and conveyer discharge assemblies with a single set of the breaker members 39.

From the foregoing it will be apparent that I have devised an improved apparatus for conveying and feeding wood waste. In actual practice my invention has proved satisfactory in every way.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In apparatus for feeding wood waste, a wood waste bin having a bottom, there being parallel spaced apart material discharge openings in the bin bottom, troughs beneath the openings having side walls, plates forming partial bottoms for the troughs, drag chain conveyers having upper flights mounted to slide on the upper surfaces of the plates, thereby to discharge material on the plates over the ends thereof, a shaft in the bin mounted for rotation above the bottom and between the openings therein, a plurality of breaker plates mounted on said shaft and having convex edges, and means to rotate the shaft in a direction to advance the convex edges of the plates into the material.

2. In apparatus for feeding wood waste, a wood waste bin having downwardly diverging side and end walls and a generally horizontal bottom, there being elongated laterally spaced material discharge openings in said bottom, a shaft mounted parallel to said elongated openings above said bottom and laterally between said openings, a plurality of breaker plates mounted on said shaft, each of said plates having a curved leading edge, means to rotate the shaft in a direction to advance the leading edges of said plates into the material, and drag chain type conveyers located beneath said openings in the bin bottom and adapted to discharge material fed thereon through said openings.

References Cited in the file of this patent

UNITED STATES PATENTS

| | | |
|---|---|---|
| 361,416 | Holgate et al. | Apr. 19, 1887 |
| 1,582,798 | Stephens | Apr. 27, 1926 |
| 2,695,734 | Cook et al. | Nov. 30, 1954 |

FOREIGN PATENTS

| | | |
|---|---|---|
| 699,706 | Great Britain | Nov. 11, 1953 |